(12) United States Patent
Jacobs et al.

(10) Patent No.: US 7,405,497 B2
(45) Date of Patent: Jul. 29, 2008

(54) INTEGRATED POWER SUPPLY SYSTEM

(75) Inventors: James K. Jacobs, Toronto (CA); Sankar DasGupta, Mississauga (CA); David Vandermeer, Waterdown (CA)

(73) Assignee: Electrovaya Inc., Mississauga (CA)

( * ) Notice: Subject to any disclaimer, the term of this patent is extended or adjusted under 35 U.S.C. 154(b) by 502 days.

(21) Appl. No.: 10/822,856

(22) Filed: Apr. 13, 2004

(65) Prior Publication Data

US 2005/0225177 A1    Oct. 13, 2005

(51) Int. Cl.
H02J 3/00    (2006.01)

(52) U.S. Cl. ......................................................... 307/82

(58) Field of Classification Search .................... 307/82, 307/71; 363/71
See application file for complete search history.

(56) References Cited

U.S. PATENT DOCUMENTS

| | | | |
|---|---|---|---|
| 5,663,874 A | | 9/1997 | Mader et al. |
| 5,691,870 A | | 11/1997 | Gebara |
| 5,731,731 A | | 3/1998 | Wilcox et al. |
| 5,870,284 A | | 2/1999 | Stewart et al. |
| 5,903,767 A | | 5/1999 | Little |
| 5,955,797 A | * | 9/1999 | Kim ............................ 307/150 |
| 5,959,439 A | * | 9/1999 | Shenai et al. ................. 323/222 |
| 5,966,003 A | | 10/1999 | Takimoto et al. |
| 6,034,517 A | | 3/2000 | Schenkel |
| 6,075,295 A | | 6/2000 | Li |
| 6,262,905 B1 | | 7/2001 | Zhang et al. |
| 6,396,137 B1 | * | 5/2002 | Klughart ....................... 257/691 |
| 6,448,672 B1 | | 9/2002 | Voegeli et al. |
| 6,465,909 B1 | | 10/2002 | Soo et al. |
| 6,476,589 B2 | | 11/2002 | Umminger et al. |
| 6,480,367 B2 | | 11/2002 | Shi et al. |
| 6,483,204 B2 | | 11/2002 | Hanaki |
| 6,541,879 B1 | * | 4/2003 | Wright ........................... 307/31 |
| 6,559,492 B1 | | 5/2003 | Hazucha et al. |
| 6,580,258 B2 | | 6/2003 | Wilcox et al. |
| 6,583,520 B2 | | 6/2003 | Shi et al. |
| 6,608,402 B2 | | 8/2003 | Soo et al. |
| 6,703,722 B2 | * | 3/2004 | Christensen ................... 307/71 |
| 6,756,689 B2 | | 6/2004 | Nam et al. |

(Continued)

OTHER PUBLICATIONS

No Author, "National Semiconductor Unveils Innovative, 100 V Cascaded DC-DC . . . ," Web: http://www.national.com/news/item/0,1735,835,00.html, Feb. 3, 2003, Internet publication.

(Continued)

Primary Examiner—Stephen W Jackson
Assistant Examiner—Michael Rutland Wallis (57) ABSTRACT

An ultra-high-efficiency switching power supply system integrating, into a single package, power conversion switches for multiple power supplies, an input power switching block, an output power switching block, control logic for controlling the power conversion switches and control input/output ports. This integrated multiple power supply package is called a Power Bridge and preferably implements the integrated components as one or more integrated circuit chips housed in the package housing. The Power Bridge is a bridge between the microprocessor of a portable computer and its internal and external power sources. The power supply system facilitates board design because the ultra-high-efficiency power module generally requires less space and generates less heat than conventional power supply circuitry. The power supply module improves power management because of improved communications connections between the power supply module control circuitry and other components, such as busses, other bridge modules and embedded controllers.

37 Claims, 7 Drawing Sheets

U.S. PATENT DOCUMENTS

| | | | |
|---|---|---|---|
| 6,774,611 | B2 | 8/2004 | Umminger et al. |
| 6,975,098 | B2 * | 12/2005 | Vinciarelli ............... 323/266 |
| 7,119,458 | B2 * | 10/2006 | Barnes et al. ............. 307/65 |
| 2001/0007134 | A1 | 7/2001 | Odaohhara |
| 2002/0112191 | A1 | 8/2002 | Pelissier et al. |
| 2002/0188875 | A1 | 12/2002 | Hwang et al. |
| 2003/0009702 | A1 | 1/2003 | Park |
| 2003/0031034 | A1 | 2/2003 | Rodriguez et al. |
| 2003/0185030 | A1 | 10/2003 | Uematsu |
| 2003/0220026 | A1 | 11/2003 | Oki et al. |

OTHER PUBLICATIONS

No Author, "Cascaded dc-dc controller-driver chipset," Web: http://www.ferret.com.au/articles//ff/0c0142ff.asp, Feb. 13, 2003, Internet publication.

No Author, "Chipset Raises High-to-Low Voltage DC/DC Conversion . . . ," Web: http://powerelectronics.com/ar/power_chipset_raises_hightolow/, Feb. 5, 2003, Internet publication.

No Author, "Adjustable Output TFT-LCD Triple switching Regulator" Web: http://www.linear.com/cn/prod/datasheet.html?datasheet=764, undated, Internet publication.

Wu, "SOT-23 Switching Regulator with Integrated 1A . . . ," Internet pub'l, Web: http://www.linear.com/pub/document.html?pub_type=desn&document=258, Jun. 2000.

No Author, "LT1943L: High Current Quad Output Regulator . . . " Web: http://www.linear.com/pub/document.html?pub_type=pr&document=512, Dec. 23, 2003, Internet Publication.

No Author, "LT1976: 60Vin, 1.5A Step-Down Switching Regulator Has . . . ," Web: http://www.linear.com/pub/document?htmlpub_type=pr&document=486, Sep. 2, 2003, Internet publication.

Chee et al., "Highly Integrated Highly Efficiency DC/DC Conversion," Web: http://www.linear.com/pub/document.html?pub_type=desn&document=118, Mar. 1995, Internet Publication.

No Author, "LTC1439G: Full Featured Multiple-Output DC/DC Converter . . . ," Web: http://www.linear.com/pub/document.html?pub_type=pr&document=98, Sep. 26, 1997, Internet publication.

No Author, "Power Management and Wireless Solutions for Handheld Applications," Linear Technology Chronicle, 2003, pp. 1-5, 8, vol. 12, No. 6, Internet Publication.

No Author, "power management solutions for Programmable Logic ICs," Linear Technology Chronicle, Oct. 2002, pp. 1-8, vol. 11, No. 10, Internet Publication.

No Author, multiple articles, Linear Technology Chronicle, Jun. 1998, pp. 1, 2, 4, vol. 7, No. 6, Internet Publication.

No Author, "The LT1533 Heralds a New Class of Low Noise Switching Regulators," Linear Technology Magazine, Aug. 1997, pp. 1-5, vol. VII, No. 3, Internet Publication.

No Author, "Dual 550kHz Synchronous Switching Regulator . . . ," Web: http://www.linear.com/prod/datasheet.html?datasheet=799, undated, Internet Publication.

* cited by examiner

INTEGRATED POWER SUPPLY SYSTEM

FIELD OF THE INVENTION

This invention relates to power supply systems for supplying a plurality of electrical power signals, each power signal having individual characteristics (e.g., voltage, current). This invention more particularly relates to power supplies, power supply systems, chipset design and power management methods for portable computers.

DESCRIPTION OF THE RELATED ART

First, some preliminary notes on terminology will be provided. "Power signals" generically refers to any electric power communicated over an electrical conduction path—the power signals do not generally carry any substantial informational component and are needed primarily for the power and energy they provide to drive loads. As used herein, "power source" refer to sources of electrical power that do not have the appropriate electrical characteristics (e.g., voltage, voltage regulation, current) to be used to directly drive loads of interest. Examples of power sources include alternating current ("ac") power from a conventional wall outlet and battery power.

As used herein, "power supply" refers to any device that changes the characteristics of a power signal so that the changed, or converted, power signal can be used to directly (or at least more directly) drive loads of interest. A "power supply system" is any system including one or more power supplies. Herein, the focus will largely on be on power supply systems with multiple power supplies and embodying some degree of integration of power supply hardware.

Conventional power supply systems are often required to output more than one regulated voltage. For example, a power supply system for a conventional computer is typically required to output several voltages for the various components of the computer system that require power. For example, the power supply system for a computer may be required to output voltages of 5 V, 3.3 V and 1.5 V because of the different power requirements of the various computer components or because different voltages are required by the same component at different times.

Although the requirement of two or more regulated dc voltage power signals is not unique to computers, computer design presents a power supply challenge because of the relatively large number of required regulated power signals, the required precision and accuracy of the voltage regulation and because of space constraints. With regard to spatial layout, the various packages and other components of a conventional power supply system for a computer are generally distributed in space over a mainboard, or motherboard, as will be further explained hereinbelow.

The power supply system is a significant cause of unwanted heat and wasted energy in personal computers (PCs). This heat and energy waste is an issue of heightened concern in compact computers, such as tablet PCs and other laptop systems because: (1) these compact computers only have a small volume in which the unwanted heat tends to collect; and (2) there tends to be less space and/or power available for cooling systems (e.g., cooling fans). Another reason that the wasted energy is such a concern in compact computers is that these computers more often operate on battery power, and wasted energy decreases the amount of time the computer can operate before external power (e.g., a battery recharge) is required. Another reason that the wasted energy is such a concern is that the wasted energy is dissipated as heat and contributes to the above-noted thermal concerns.

In PCs, the power supply system is generally a group of some seven to twelve separate power supplies. The entire power flow for the PC usually runs through the power supply system, sometimes through multiple stages. Because unit efficiencies are generally on the order of 80 to 90%, and also because of cascading (battery charger/system 5V/core power; battery charger/inverter), the overall efficiency of the power supplies is commonly 80% or even lower. Therefore, 20% or more of the total system power is usually wasted in the power supply system, power that must be dissipated as unwanted heat.

At least partially because of the above-noted efficiency, energy and thermal concerns, there are ongoing efforts to design higher efficiency power supply. For example, U.S. Pat. No. 6,559,492 to Hazucha et al. discloses a high efficiency dc-dc converter fabricated on a semiconductor die. As a further example, U.S. published patent application No. 2002/0017897 to Wilcox et al. discloses a high efficiency switching voltage regulator. Conventional high efficiency dc-dc converters generally have efficiencies above 80% and may even be able to actually achieve efficiencies of over 90%.

There are many dc-dc converter topologies, with buck and boost being the two most popular. Most power supply systems operate in buck-only mode because boost efficiencies are usually even lower, and their costs greater, than for buck systems. Unfortunately, the buck-only power supply systems require the use of battery series strings of three or four cells (about 8 to 16 volts) with concomitant balance and distribution restrictions. These multi-cell series strings greatly limit the battery designer's ability to pack odd-shaped spaces with battery capacity.

Conventional power supply systems for personal computers generally include at least some of the following components: power input circuitry, power conversion switches, passive power conversion components, power output circuitry, and control circuitry. Each of these components will now be explained.

The power input circuitry communicates power signals from power sources (eg, batteries, wall outlet transformer) to the power conversion switches and passive power conversion components. The power input circuitry conventionally includes switches for selectively routing signals from the power source. These power input circuitry switches are conventionally distributed, spatially remote from each other, on the board.

In a power supply circuit, the circuit portion including the power conversion switches and/or passive power conversion components is commonly known as a dc-dc converter or (more generally) a power converter. In the power converter portion, the power signal input, input from the power source, is converted into the output power signal, output to the rest of the computer, by in some way changing the electrical characteristics (eg, voltage, compensation, current, degree of regulation) by the action of the power conversion switches and/or the passive power conversion components. In dc-dc converters, the input power signal and the output power signals are both dc, but in many dc-dc converters, the magnitude of the dc voltage may vary over time (eg, vary depending on power requirements of the CPU being supplied with power output by the dc-dc converter).

Power supplies including power conversion switches, a primary focus of this document, are called switching power supplies. The relatively fast on/off operation of the power conversion switches gives switching power supplies something of a discrete or digital character to the power supply.

Power supplies that do not include power conversions switches, a secondary focus of this document, are called linear power supplies.

The passive power conversion components (sometimes herein generically called "passive components") generally take the form of inductors, capacitors and/or transformers. In switching power supplies, the flow of electrical power into and/or out of these passive power conversion components is controlled by the power conversion switches, thereby converting the input power signal into an output power signal. Both the power input switches and the power conversion switches in some sense determine the flow of electrical power through the power supply. The power output switches do, too. However, the power input and output switches are generally switched at long intervals relative to the transient performance of the passive components. Therefore, the power input and output switches effectively serve as on/off switches or routing controls for the power signals. On the other hand, the power conversion switches are generally switched at relatively shorter intervals. That is how the power conversion switches help convert the power signal, rather than serving to turn the converted signal off. The power conversion switches are generally located on the board at spatially remote locations: from each other, from the power input switches and from the power output switches.

The power output circuitry communicates power signals from the power conversion switches and passive power conversion components to the computer components that require power. These powered computer components conventionally include the core (or CPU), the memories, the card bus, the clocks, the display backlight, disk drive motors, input devices (eg, keyboard, mouse), cooling fans and so on. The power output circuitry selectively routes the various power output signals of the various power supplies to the various destinations. These power input circuitry switches are conventionally distributed, spatially remote from each other, on the board, although some CPU's have specifically-tailored, integrated power output switching blocks.

The control circuitry controls the operation of the power conversion switches and may additionally control operation of the power input and output switches to some degree. In a switching power supply, the control circuitry for switching power supplies generally includes driver circuits and logic for controlling the operation of the power conversion switches. Control circuitry for switching power supplies often includes current and/or voltage sensing circuitry and logic so that the input power signal and/or output power signal can be used as input(s) to the driver logic in determining exactly how to control the power conversion switches through the driver circuitry. The control circuitry for multiple power supplies has conventionally sometimes been integrated into a single housing in the form of an integrated circuit (IC). As will also be explained below, control circuit for the switches of a single power supply has sometimes been integrated with the power conversion switches for that single power supply.

As the power supply complexity of low power processors and peripherals has increased, the amount and/or proportion of board space dedicated to the power supply system has also increased. This increased complexity has also caused the relative cost of power supply systems to increase. This is because the complex power requirements require more hardware components, electronic design effort, physical layout design effort and/or thermal design effort be dedicated to the power supply system.

There are reasons that other components of power supply systems have not generally been integrated. When power levels are substantial and efficiencies are low, integration of high-power switches with control circuitry of dc-dc converters would not generally be advisable. This is because of the heat dissipated by the high-power switches. Because switching power supplies can't readily be integrated, board layout of switching power supplies remains a challenging, and potentially costly, design effort. Presently, most chipset suppliers provide power reference designs (including component selection and layout) to support computer designers. Even with this support, the design of the power supply system is a major part of the difficulty of the design of the main boards of portable computers. Poor design of the power supply systems generally results in computers having excessive power consumption, excessive heating, poor performance and/or unstable performance.

Despite the above-noted difficulties, there have been some limited efforts at power supply system integration. Some of these efforts will now be discussed.

U.S. Patent Application Publication No. 2002/0188875 to Hwang et al. discloses a power supply control including an integrated circuit. Voltage converter controllers for three voltage converters are located in the integrated circuit. However, the three voltage converters themselves are not disclosed as being located in the integrated circuit.

U.S. Pat. No. 6,583,520 to Shi et al. discloses power supply system including a hybrid 4-in-1 power controller chip that integrates a synchronous buck switching regulator, a standard buck switching regulator, a linear controller and a linear regulator. As shown by the dashed outline in FIGS. 1A and 1B of this document, much of the circuitry of the Shi et al. power supply system is disclosed to be integrated in a single chip.

U.S. Patent Application Publication No. 2003/0102489 to Nam et al. discloses a power device having a package structure where the package includes a switching device (that is, a transistor) and a driving device (that is, a control integrated circuit chip). However, the Nam et al. package is a single power supply, rather than a multiple output power supply system.

Description Of The Related Art Section Disclaimer: To the extent that specific publications are discussed above in this Background section, these discussions should not be taken as an admission that the discussed publications (e.g., patents) are prior art for patent law purposes. For example, some or all of the discussed publications may not be sufficiently early in time, may not reflect subject matter developed early enough in time and/or may not be sufficiently enabling so as to amount to prior art for patent law purposes.

SUMMARY OF THE INVENTION

At least some embodiments of the present invention relate to the degree and/or type of integration of power supply systems, especially switching power supply systems. This greater power supply integration can lead to many advantages. At least some embodiments of the present invention are advantageous for at least some of the following reasons:

(1) decreased substrate space required for the power supply system;
(2) decreased mechanical design effort required to place the power supply system on the substrate;
(3) decreased component count and correspondingly decreased hardware logistical issues in manufacturing computer;
(4) more efficient cooling possible due to concentration of heat from power supply system;
(5) possible to provide a greater number of power signals and corresponding flexibility in selecting and/or designing peripheral sub-systems of the computer;

(6) integrated I/O ports and buss connections mean that less hardware may be required electrically communicate power signals to diverse locations on and/or off of the substrate;
(7) improved communication with the microprocessor or CPU, potentially resulting in better access to information upon which to base control of the power supply;
(8) improved power on and power off control for the computer system as a whole;
(9) easier power supply system programmability;
(10) decreased number of packages and/or components need be included in power supply system kits; and
(11) decreased computer system cost.

Generally speaking, many embodiments of the present invention relate to the integration of power conversion switches, some of the control logic (eg, switch driver controllers) and ports for receiving addition control (eg, mode control) within a single package housing (see DEFINITIONS). Preferably this housing contains one (or more) integrated circuit chips that implement the power conversion switches and the control logic. Preferably, the package is formed as flip chip by conventional flip chip construction methods. Other embodiments of the present invention relate to the mounting of external components (eg, passive power conversion components, such as capacitors) to a package containing power conversion switches.

DETAILED DESCRIPTION OF SOME EMBODIMENTS

Before discussing the embodiments shown in the drawings, a very general, exemplary embodiment of a power supply system for a portable computer will now be discussed. In this embodiment, a small integrated module forms a Power Bridge between the CPU, memory, and other power-consuming loads on one side and the power resources (batteries, ac adapter input) on the other. The highly integrated power management module (Power Bridge) includes multiple power supplies, a logic control module to facilitate coordinated control of the power supplies and Input/Output (I/O) ports. The I/O ports facilitate communications between the logic control module and other computer components.

The power supplies are dc-dc converters. Each dc-dc converter comprises an active control function, high-speed switches and switch drivers, capacitors and one or more magnetic components. The magnetic component(s) are large and are therefore located outside the Power Bridge. Some high-frequency capacitance may be integrated into the Power Bridge to form a hybrid module, but most of the capacitors will be located outside the Power Bridge along with the magnetic components.

To conserve power in the portable computer it is normal to adjust the voltage of the power supply for the microprocessor core and turn off certain other power supplies when full function of the computer is not required. In this embodiment, these power management functions are coordinated and facilitated by the inclusion within the Power Bridge of a logic control block. The logic control block also serves to manage the battery charging function, screen brightness function, cooling fan speed, and other functions.

In order that the other chipset components and controllers in the portable computer can coordinate their power requirements with the actions and settings of the Power Bridge, the Power Bridge is equipped with appropriate communications ports such as Universal Serial Buss (USB), Inter-Integrated Circuit (I2C) and dedicated (fixed) I/O lines.

As a normal result of high levels of integration, it would be expected that this embodiment of the Power Bridge would be chipset-specific. The logic control block is preferably programmable, allowing many of the dc-dc converters and the algorithms for their use to be reconfigured at any time. However, in some applications, the Power Bridge manufacturer may choose to limit the programmability of the logic control block, for functional, economic or other reasons.

Figure 1:
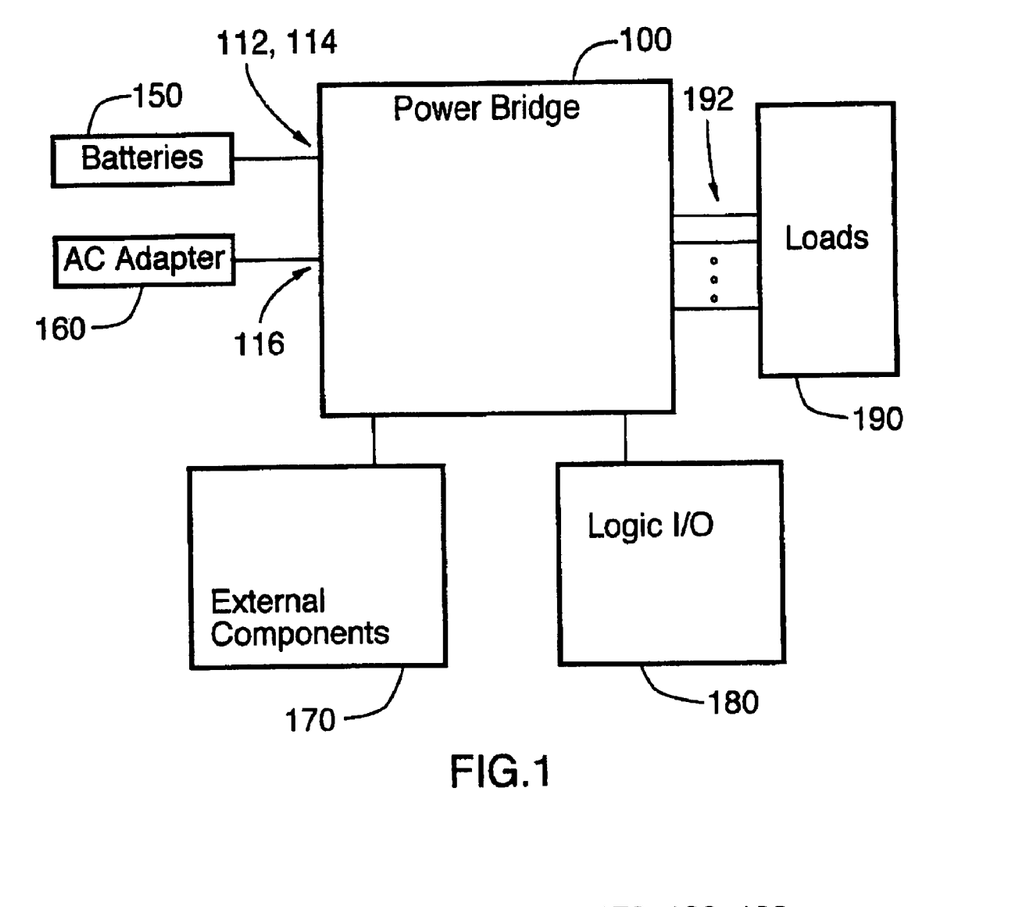
FIG. 1 is a schematic diagram of a first power supply system according to the present invention.
Figure 2:
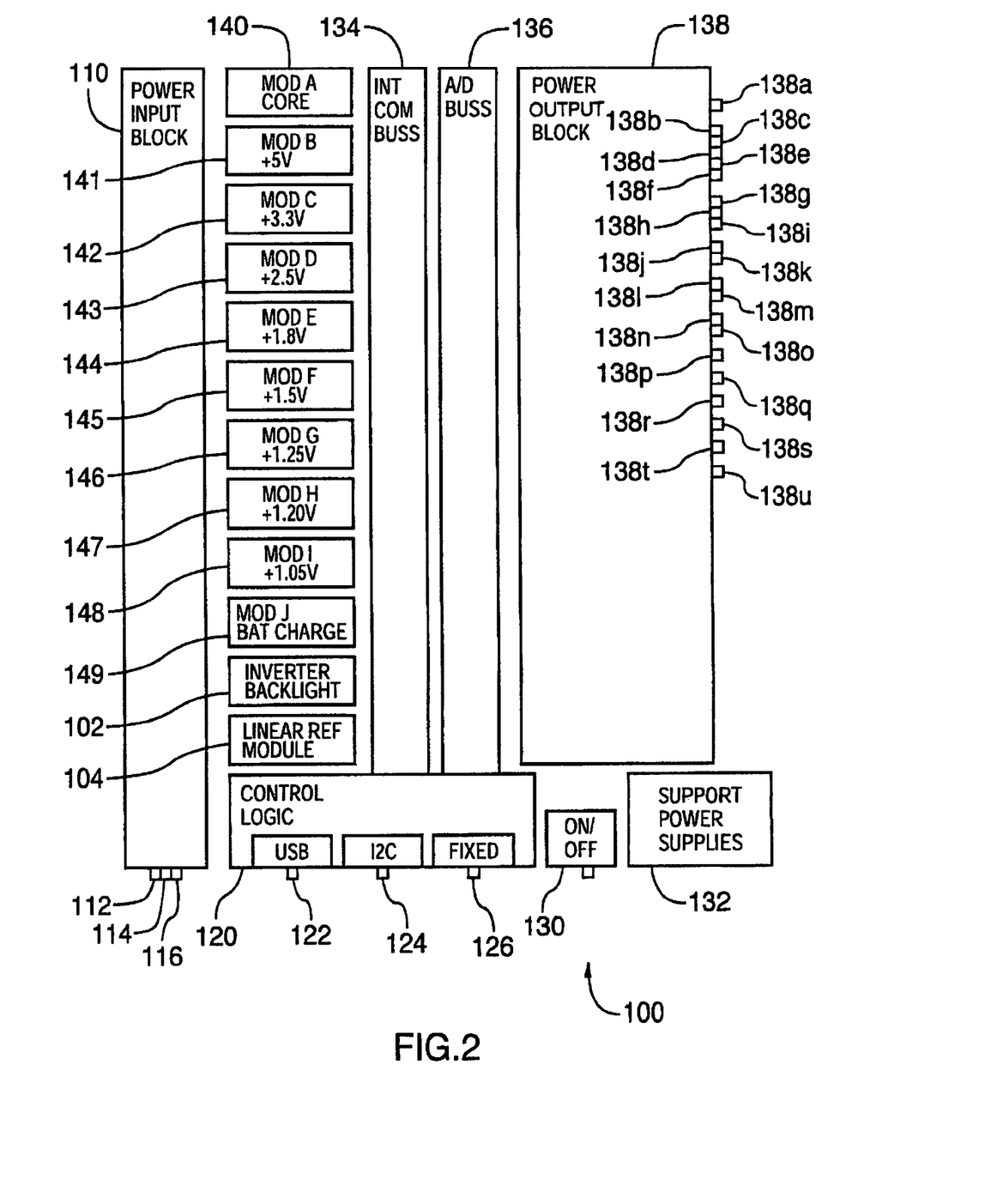
FIG. 2 is a schematic diagram of Power Bridge 100 portion of the FIG. 1 power supply system.
Figure 3:
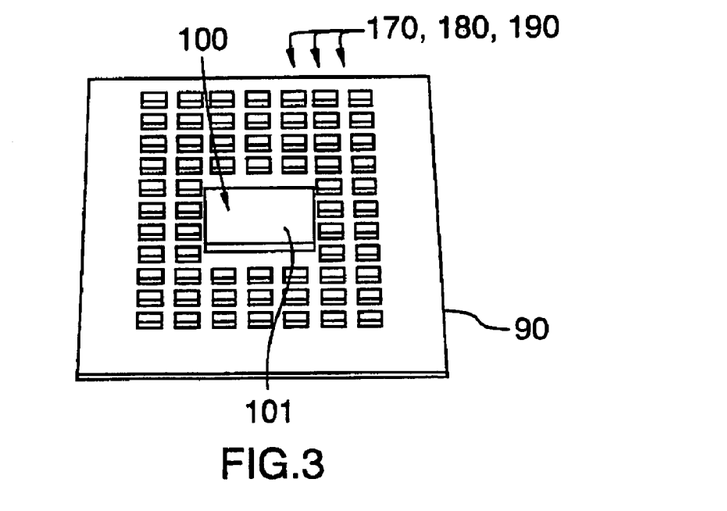
FIG. 3 is a perspective view of a circuit board including the FIG. 1 power supply system.

FIGS. 1 to 3 show Power Bridge 100. In this preferred embodiment of the invention, Power Bridge 100 meets all power supply needs of a portable computer (not separately shown). First the various components of FIGS. 1 to 3 will be identified, and then the hardware, operation and functionality of the components will be discussed.

As shown in FIG. 3, Power Bridge is mounted on board 90 along with some of the other components of the computer system 170, 180, 190. The Power Bridge is enclosed and protected by package housing 101. FIG. 1 shows a schematic of Power Bridge 100 and some of the components with which it interacts. More particularly, Power Bridge 100 gets its input power signals from batteries 150a and ac adapter 160. The Power Bridge converts the input power signals to output power signals with the help of external components 170 and logic I/O 180. The output power signals from the Power Bridge power loads 190.

As shown in the schematic diagram of Power Bridge 100 in FIG. 2, Power Bridge 100 includes: power input block 110, control logic block 120, on/off control block 130, support power supplies block 132, internal communications buss 134, A/D buss 136 and power output block 138 and power conversion switch modules 102, 104, 140, 141, 142, 143, 144, 145, 146, 147, 148, 149.

As further shown in FIGS. 1 and 2, power input block 110 includes battery A connection 112, battery B connection 114 and ac adapter connection 116. As shown in FIG. 2, control logic block 120 includes USB port 122, I2C port 124 and fixed port 126. As shown in FIG. 2, the power conversion modules of Power Bridge 100 include inverter backlight module 102, linear reference module 104, converter A (core) 140, converter B (+5V) 141, converter C (+3.3V) 142, converter D (+2.5V) 143, converter E (+1.8V) 144, converter F (+1.5V) 145, converter G (+1.25V) 146, converter H (+1.20V) 147, converter I (+1.05V) 148 and converter J (main battery charge) 149. The parenthetical portions of the power conversion module names refer to their respective output voltages and/or functionality.

Output power switching module 138 includes output connections 138a to 138u. These output connections are named as follows:

| | |
|---|---|
| 138a | core |
| 138b | 5V_S3 |
| 138c | 5V_S1 |
| 138d | 5V_S0 |
| 138e | 5V_cardbus |
| 138f | 5V_USB |
| 138g | 3.3_S3 |
| 138h | 3.3_S1 |
| 138i | 3.3_EC |
| 138j | 2.5_S3 |
| 138k | 2.5_S1 |
| 138l | 1.8_S3 |
| 138m | 1.8_S1 |
| 138n | 1.5_S3 |
| 138o | 1.5_S1 |
| 138p | 1.25_S1 |
| 138q | 1.2_S1 |
| 138r | 1.05_S1 |
| 138s | 2.5V_ref |
| 138t | cooling fan; and |
| 138u | backlight AC LV. |

To begin discussion of the operation of the Power Bridge, it is first noted that the Power Bridge requires one or more power sources for providing electrical power. In most or all cases, the power source(s) will be located external to the Power Bridge. The Power Bridges converts the supplied power to form several regulated dc power outputs for the various power needs of the computer. As shown in FIG. 1, the power sources for Power Bridge 100 are batteries 150 and ac adapter 160. Batteries 150 are preferably conventional lithium ion batteries designed for portable computers. The ac adapter is preferably a conventional ac adapter for receiving ac electrical power from a wall outlet and converting this power into a dc power signal.

More particularly, batteries 150 are preferably parallel combinations of lithium-ion cells with a minimum voltage of 3 V and a maximum voltage of 4.2 V. This voltage is not generally tightly regulated, but voltage regulation is one of the functions of the power supply system. Each battery preferably includes monitoring and safety switching circuitry. Communications are normal in this interface. The batteries can request charge voltage and current. AC adapter 160 preferably supplies power at a nominal 5 or 6 to 24 V. It is noted that additional and/or alternative power sources may be used in other embodiments of the present invention. These power sources include other types of batteries now known or to be developed in the future, fuel cells and solar power sources.

As shown in FIG. 1, the Power Bridge outputs multiple power signals to various loads 190 over power signal paths 192. For this exemplary portable computer system, the loads powered by the Power Bridge include: the core (CPU), memories, card bus, docks, display backlight, disk drives, input devices (eg, mouse, keyboard) and cooling fans.

Logic I/O block 180 represents the digital communication with the computer, especially with the chipset and/or embedded controller. This is how the Power Bridge determines power output requirements and other tasks it is supposed to perform over time. Preferably logic I/O block 180 is an embedded microcontroller in the Power Bridge which receives, decodes and dispenses these digital command signals.

Now the internal portions of the Power Bridge will be discussed. The Power Bridge is preferably formed as a semiconductor die integrated circuit chip, encased in package housing 101. Package housing 101 is a conventional package that protects the semiconductor die integrated circuit chip (not separately shown) and includes signal paths for routing power signals and other signals between the integrated circuit chip and board 90. As will be discussed below with reference to FIG. 2, the power supply system of FIGS. 1 to 3 integrates much of the power supply system within package housing 101 on the integrated circuit chip. Alternatively, the package housing could contain multiple chips or other types of extremely small scale circuitry that may be developed in the future.

Power input block 110, shown in FIG. 2, is an exemplary input switching block. The power input block is a set of switches that selectively routes power input signals from connections 112, 114, 116 to the power conversion circuitry of the Power Bridge, such as power conversion modules 102, 104, 140-149. The selective routing of power input signals will generally depend on the status of the batteries and the ac power according to algorithms now known or to be developed in the future. The power input block is integrated in the integrated circuit chip, along with much of the rest of the power supply system, rather than being spatially distributed over board 90.

Power input block 110 preferably interfaces with batteries 150 using standard System Management Bus ports and communication protocols (as is the current industry standard). When ac adapter power is present, the switching block of power input block 110 preferably detects this and connects the power input from the ac adapter to the other Power Bridge functions. If charging of either battery is needed, the power input block preferably connects the battery charge supply to the battery to be charged. When AC adapter power is not present or is removed, the the batteries are used as the power source. In this case, the power input block connects a batteryas the power source for the Power Bridge, in a manner so as to maintain power continuity.

Power output block 138, shown in FIG. 2, is an exemplary output switching block. The power output block is a set of switches that selectively routes output power signals from the power conversion circuitry of the Power Bridge, such as power conversion modules 102, 104, 140-149, and/or external components 170. The selective routing of power output signals will generally depend on the power needs of loads 190 as determined by algorithms now known or to be developed in the future. The power output block is integrated in the integrated circuit chip, along with much of the rest of the power supply system, rather than being spatially distributed over board 90.

Power output block 138 preferably provides power management, power distribution and protective current limiting (in ways now known or to developed in the future). Preferably, current sensing (current sensing means not separately shown) on individual outputs 138a to 138u allows the Power Bridge to protect itself from overload and to simultaneously protect against malfunctioning loads, connecting traces and other short circuits. This current sensing and protection feature can eliminate the need for thermal fuses in many cases.

Much of the power output block algorithms are concerned with turning off outputs that aren't needed or wanted. In some cases two different dc-dc converters can be set as alternative sources to drive the same output (e.g., 5 V), but at different current levels. This can help improve efficiency because a dc-dc converter optimized for high-current performance will generally be inefficient when supplying low-current loads.

The power conversion performed by the Power Bridge will now be discussed. The power conversion is performed by power conversion switches and passive power conversion components included in the Power Bridge and in external components 170. As shown in FIG. 2, a set of power conversion modules 102, 104, 140-149, working in conjunction with passive, passive external components, convert the input power signal(s) to obtain power output signals having the regulated voltages, controlled currents or other characteristics needed by various loads 190.

The power conversion modules are integrated into the integrated circuit chip along with the other blocks shown in FIG. 2. Each power conversion module includes power conversion switches (not separately shown in FIG. 2) and any driver hardware necessary to operate these power conversion switches (not separately shown in FIG. 2). The power conversion switches control the flow of electrical power through the passive components, which are shown generally in FIG. 1 as external components 170. The external components will preferably include capacitors and/or inductors, and may also include transformers, resistors and/or any other types of passive components that may be developed in the future. While the passive components of the embodiment of FIGS. 1 to 3 are all external components, some or all of these components could be included within package housing 101, either integrated into the integrated circuit chip or as separate piece(s) resident in the package along with the chip. In fact, if further miniaturization of magnetic circuit elements occurs in the future, it may become easier to further integrate even the magnetic circuit elements. It is preferable to integrate these components for many of the reasons discussed in this document with respect to integration of the Power Bridge.

The main reason for locating the passive components external to the package housing is their relatively large size, heat and three-dimensional profiles. Generally speaking, any capacitors should be placed as close as possible to the package housing containing the power conversion switches. This is because longer current paths between capacitors and the other power conversion circuitry adds unwanted inductance. Besides placing external capacitors on the exterior surface of the package housing, the capacitors may also be placed on the underside of the board opposite the package housing. The inductors can generally be placed further away from the package housing because added inductance is generally less of a concern in a circuitry portion whose purpose is the addition of inductance.

The node and bypass capacitors preferably are of two types: (1) very high frequency capacitors; and (2) lower frequency capacitors. The very high frequency capacitors are of small size and are preferably located on top of the Power Bridge and directly under circuit board 90. The lower frequency capacitors are electrically connected in parallel with the high frequency capacitors and are located on the circuit board in close spatial proximity to the Power Bridge.

Four, exemplary, alternative power conversion schematics (including power conversion switches and external components) are respectively shown in FIGS. 4A to 4D. These power conversion schemes are examples of the type of power conversion circuitry that could be used in the present invention.

Figure 4A:
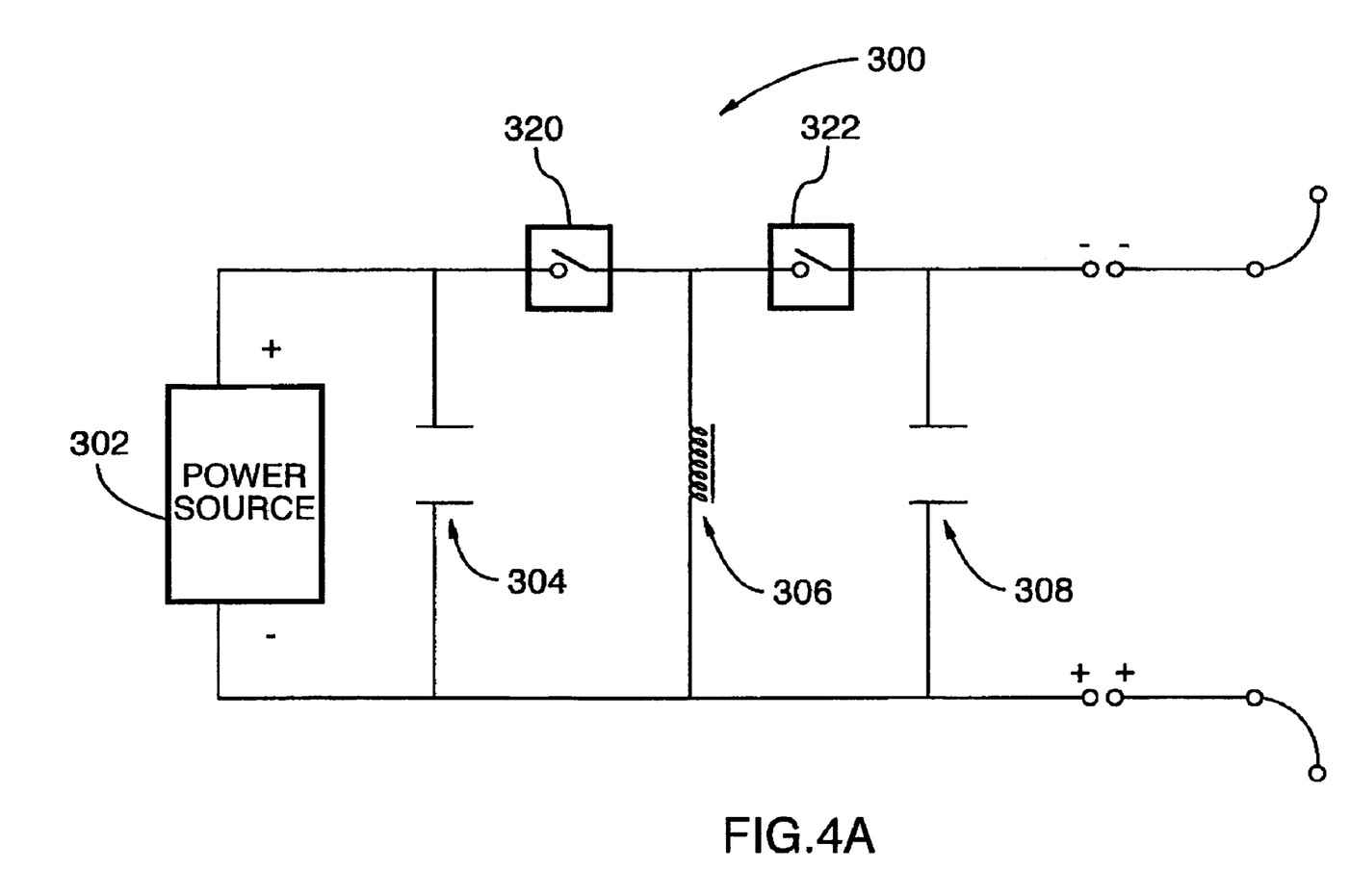
FIGS. 4A to 4D are schematic diagrams of four embodiments of power conversion circuitry that may be used in power supplies according to the present invention.
Figure 4B:
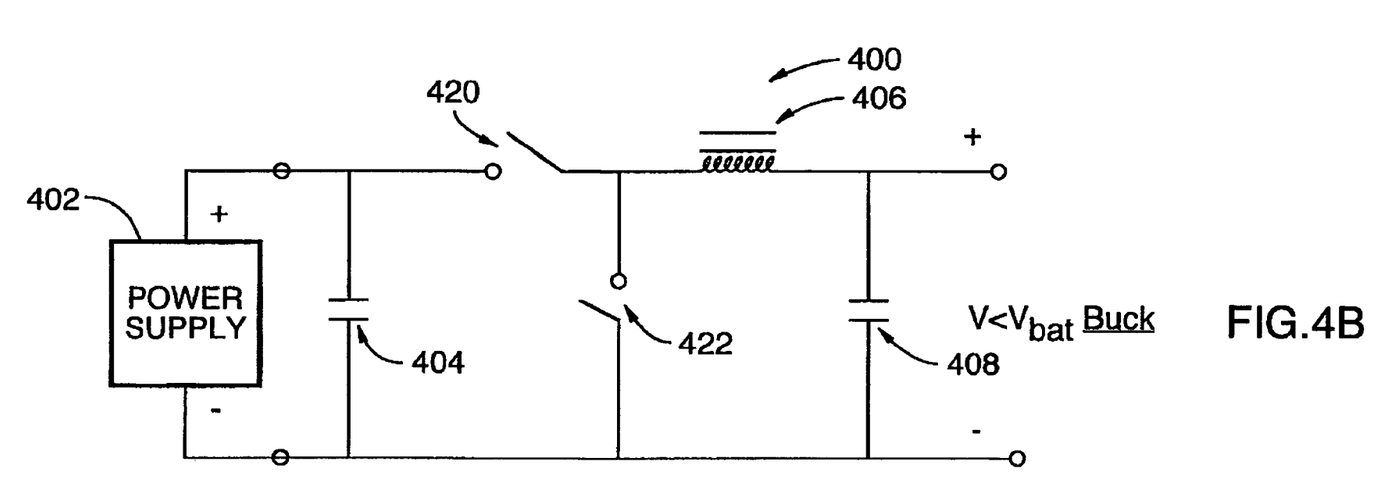
Figure 4C:
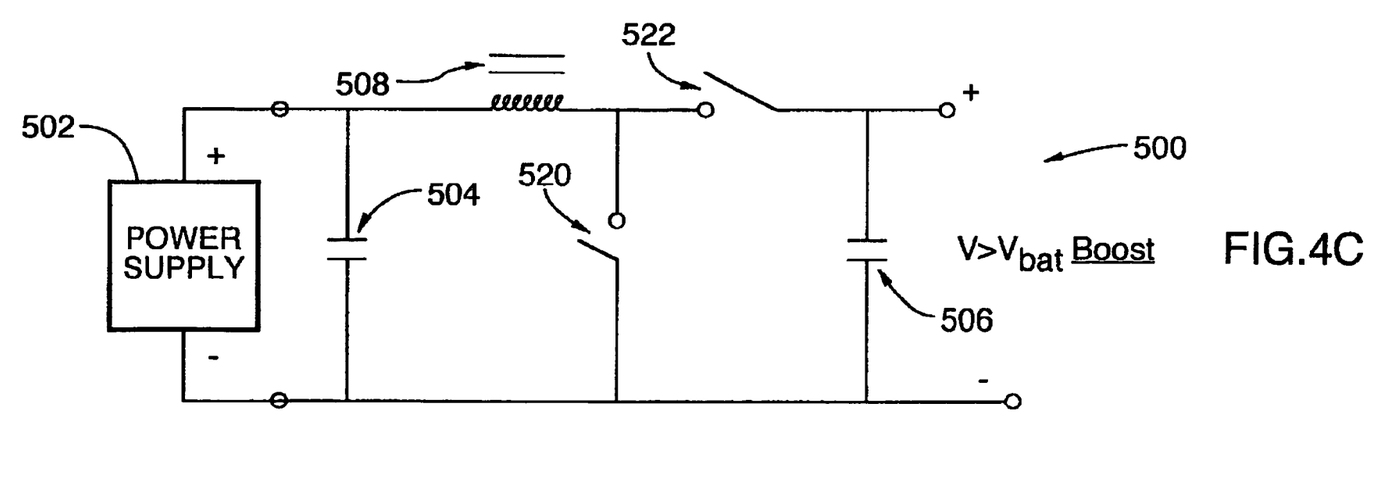
Figure 4D:
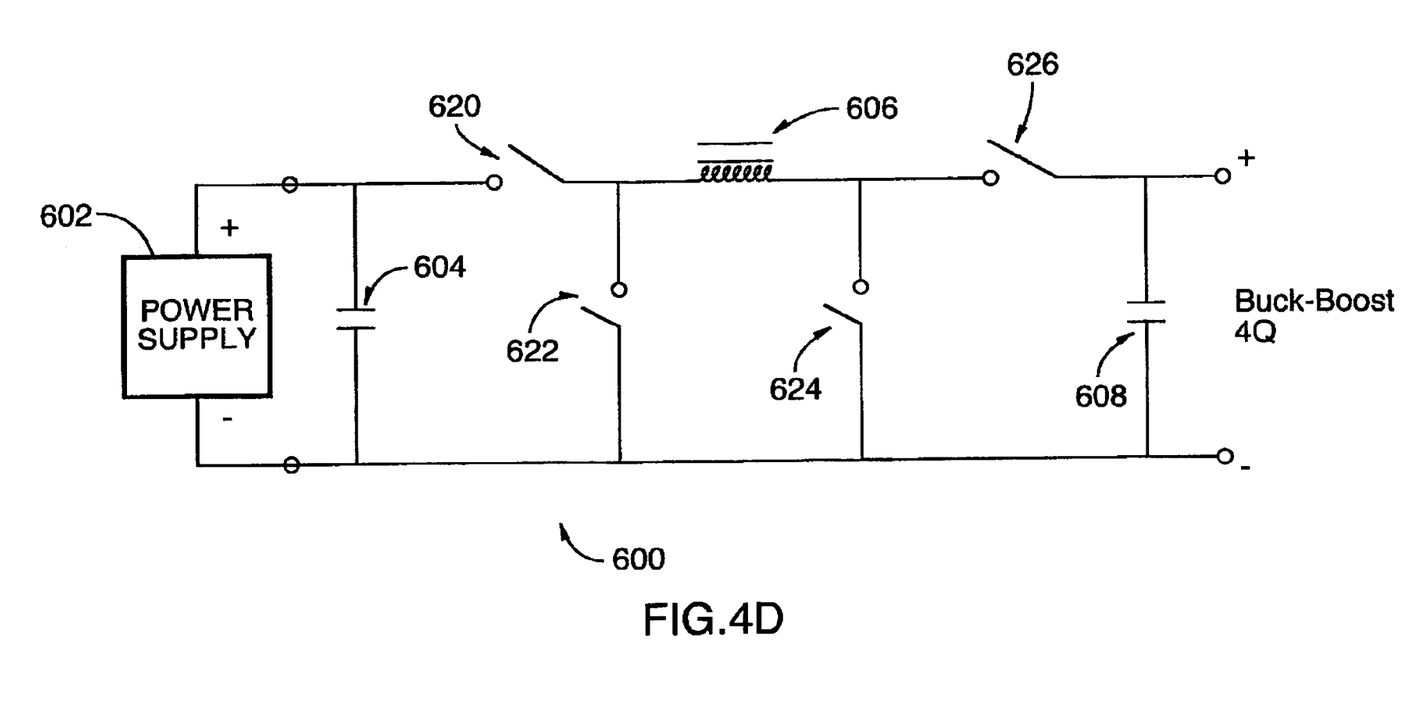

Power conversion circuit 300, shown in FIG. 4A, includes power source 302, capacitors 304, 308, inductor 306 and power conversion switches 320, 322. Power conversion circuit 400, shown in FIG. 4B, includes power source 402, capacitors 404, 408, inductor 406 and power conversion switches 420, 422. Power conversion circuit 500, shown in FIG. 4C, includes power source 502, capacitors 504, 506, inductor 508 and power conversion switches 520, 522. Power conversion circuit 600, shown in FIG. 4D, includes power source 602, capacitors 604, 608, inductor 606 and power conversion switches 620, 622, 624, 628. In all of these power conversion schemes 300, 400, 500, 600: (1) all of the power conversion switches are preferably integrated onto integrated circuit(s) located within a single package housing; and (2) the power source, capacitors and inductors are preferably located external to this single package housing.

Now the purpose of the various power conversion modules 102, 104, 140-149 will be discussed. Although high efficiency (see DEFINITIONS section) switching dc-dc converter modules are generally highly desirable (except for module 102, discussed below), and will even be necessary in some applications, the present invention may be applicable to other power converters and to power converter modules that are not high efficiency. The present invention is now and/or may be applicable in the future to both high power (see DEFINITIONS section) and low power (see DEFINITIONS section) power supplies. Lower power power supplies are characterized by less generation of unwanted heat and may be easier to design and implement for this reason. However, the integration of the present invention may be advantageous for higher power power supplies due to thermal performance advantages (discussed in detail below) that may be achieved with the present invention.

Module A (core) 140 supplies an accurately adjustable voltage to the microprocessor core in response to commands from other computer components. Module A (core) preferably has a buck topology with synchronous rectification to maintain high efficiency over its range of voltage and current. Ultra high efficiency (see DEFINITIONS section) is usually important here, as module A (core) could otherwise be an unacceptably large source of heat in the Power Bridge.

Module B (+5V) 141 supplies fixed 5.0 volts and is preferably of the buck/boost/pass type. Similarly, module C (+3.3V) 142 supplies fixed 3.3 volts and is preferably of the buck/boost/pass type. Several other buck-type dc-dc converters 143, 144, 145, 146, 147, 148 supply lower fixed or adjustable voltages.

Power conversion module (inverter backlight) 102 is unlike the other modules 104, 140-149 in that its power conversion switches are for inverter-type power conversion, rather than for dc-dc power conversion. More particularly, the screens of portable computers are illuminated by fluorescent backlights that require a voltage of about 1500 volts ac for starting the light and about 500 volts ac for operation. This is preferably supplied by a transformer (not shown) of a magnetic or piezoelectric type. This transformer is not included with the Power Bridge, but rather, is located in close proximity to the fluorescent light. The Power Bridge supplies an ac signal of about 12 volts to this high voltage transformer. Specifically, power conversion module (inverter backlight) 102 includes the power conversion switches for converting a dc input power signal into a 12 V ac power output signal suitable as an input power signal for the transformer. The integration of module 102 with the other dc-dc converter modules 104, 140-149 demonstrates that the integration of the present invention may extend beyond integration of dc-dc converter circuitry.

The current or duty cycle supplied is adjustable in response to the screen brightness desired. These lights represent a significant portion of the power consumption of a portable computer and effective control of the current to the lights is important for effective power management. This duty cycle and power management is built and/or programmed into logic block 120.

Some of the output connections 138a-u of power output block 138 will now be discussed. Low-power outputs are provided for the convenience of computer designers and to reduce the cost and component count of the computer mainboard. This is one way that the level of power supply integration of the present invention can save board space and/or board layout design effort. These low power outputs preferably include a 2.5 volt reference voltage output connection 138s and a low-power 3.3 volt output connection 138i. These low power outputs 138i, 138s are provided their power output signals by linear reference module (+3.3 vEC, 2.5 vref, etc.) 104.

The low power 3.3 low power volt output signal, supplied by module 104 through connection 138i is used to power the Embedded Controller ("EC") when other modules 102, 140-149 are turned off to conserve power during standby or power-off modes.

As shown in FIG. 2, control logic block 120 provides coordinated control of: (1) the switching block of power input block 110; (2) the switching block of power output block 138; and (3) all power supplies 102, 104, 140-149 of the Power Bridge. In the exemplary embodiment of FIG. 2, control logic block 120 does not operate fast enough to control the switch activity in the dc-dc converters 102, 104, 140-149. This switch activity is therefore carried out by dedicated circuitry associated with each converter. However, the control logic block does control the mode of operation and adjust the output voltage or current of each converter. It also controls the operation of power input block 110 and power output block 138. The overcurrent protection and AC adapter-to-battery switchover functions are augmented by dedicated circuitry associated with each of these functions. This allows the control logic block to operate relatively slowly, and thus with relatively low power consumption and improved efficiency.

Control logic block 120 is equipped with three I/O ports: USB port 122, I2C port 124 and fixed port 126. The USB port is primarily for communication with the Chipset. The I2C port is primarily for low-overhead communications with the EC. The fixed port is a group of fixed-purpose lines, primarily for interrupt, power-fail and high speed communications use. Internal communications buss 134 transmits internal signals from and to the control logic block. A/D buss 136 allows the control logic block to monitor input and output voltages and temperature. The control logic block and the A/D buss work together to provide accurate voltage outputs and to control battery charging more safely. More specifically, charge voltage is restricted to redundantly prevent overcharging.

The functions of each power supply, including output voltage are preferably programmably controlled through the operation of the control logic block. Similarly, the use and function of the fixed-purpose port is preferably programmable and reprogrammable. However, for economic and other reasons it may be desirable, in some applications, to restrict or limit access to this programmability and render the Power Bridge chipset-specific. Configuration to support certain specific features of memories or other peripherals can also be implemented. Additional hardware and/or software can be incorporated in the Power Bridge for support of alternate batteries, alternate AC adapter voltages, additional batteries or other future power sources (such as fuel cells and solar panels).

If desired, the Power Bridge can monitor activity on its serial and fixed-purpose ports 122, 124, 126 to determine whether the chipset components and the EC are operating or, alternatively are "hung." This watchdog function allows selective or universal cold-start resets to be effected on a reliable automatic basis. This is particularly useful for computers that are expected to operate over long periods without operator intervention.

On/off control block 130 initiates the power-up process. It is preferably an ultra-low power function, connected to the on/off switch of the computer. Conventionally, the computer's EC initiates the power up process. By instead using this special-function block of the present invention, all other parts of the computer, including the EC, can be in fully power-off states when the computer power is turned off. This conserves battery power during long idle periods.

To further explain on/off control block 130, it is noted that microcontrollers are frequently observed to malfunction whereby they no longer respond to inputs or control outputs correctly. The EC of a portable computer can be particularly troublesome in this regard, especially if it is given responsibility for the on/off switch interface. In this situation, a user's only recourse is to remove all power, including battery power, from the computer in order to effect a cold-start reset. If one or more of the power sources are located internal to the computer and are not readily removable, a cold-start reset can require the help of a qualified repair technician. Moving the on/off switch interface to a highly reliable dedicated control block within the Power Bridge allows the user to reliably effect a cold-start reset. For example, the on/off control block may be structured and programmed to effect a cold-start reset by pressing the computer's on/off switch for a specified duration.

The Power Bridge requires controlled power supplies for its own operation. Each dc-dc converter needs a power supply function to power its own operation. Its logic flow is typically low-voltage (e.g., 3V, 5V), high-speed gate circuitry. Also, the switches need special power supplies to operate them (on and off). These power needs are preferably arranged as a mixture of "bootstrapped" power supplies (from dc-dc converter outputs) and smaller dedicated supplies (not separately shown). The "bootstrapped" supplies and the dedicated supplies use the AC adapter and/or the batteries as their power source.

Among others, one or more boosted supplies of about +12 volts and one or more negative supplies of about −5 volts are preferred for powering the high-speed switches of dc-dc converters 102, 104, 140-149. For highest efficiency, a plurality of supplies can be used, each supplying a voltage which is optimal for a particular switch or set of switches. However, a smaller number of supplies may be used, chosen as compromises, with slightly reduced efficiency, but reduced complexity.

FIG. 3 shows the physical appearance of an embodiment of the Power Bridge. A central semiconductor zone contains much of the active-component function, with other active functionality distributed as needed throughout the interior of board 90 (which board acts as a substrate). In the embodiment of FIGS. 1 to 3, external connections are from the underside of board 90, using conductive bumps as is common practice in the industry. In other embodiments, the external connections include legs primarily located near the periphery of the substrate. Still other embodiments may use other types of substrates now known or to be developed in the future. Still other embodiments may not even use substrates at all—it is noted that some embodiments of the present invention may be used in applications other than computers.

Referring now to the embodiment of FIG. 3, the top surface of board 90 may be used to mount a plurality of high-frequency capacitors, and optionally other small passive components. In other embodiments the undersurface of the substrate may be used for mounting of additional small capacitors and other small passive components. In still other embodiments, both surfaces of the substrate may be used to mount these components. In still other embodiments, the associated components may not even be mounted to the same substrate as the Power Bridge. However, it is highly preferable to locate all of the capacitors, especially the high-frequency capacitors near to the switching nodes they serve. Mounting on the substrate facilitates this.

The external components 170 that tend to occupy the largest volume and/or board area are the lower-frequency capacitors and the inductors. Preferably, these are to be specified and supplied with the Power Bridge as a complete kit. Correct and efficient operation of the Power Bridge depends on selection of these passive components, and it is generally important that the capacitor and inductor combinations for which the Power Bridge circuitry was designed are in fact used. Optimized placement of these passive components is generally important as well. A multi-layer circuit specification should preferably be provided for the guidance of the designer of the mainboard. An exceptionally high component placement density is preferred for highest efficiency of operation. This also facilitates the deployment of electrical and magnetic shielding.

Of course, the supply of power supplies as separate piece-parts, with instructions, in kit form is conventional. However, the integration of present invention can substantially reduce the number of piece parts, the complexity of the instructions and the number of steps required in the power supply assembly process. This means that some embodiments of the present invention represent an improvement in kit form power supplies.

Whether operating from batteries, AC power, or other power sources, the microprocessor, video and other processors, chipset components, etc., are all generators of significant heat which must be removed from the portable computer and transmitted to the ambient air. For most effective, convenient, safe and comfortable operation it is important to limit the generation of any unnecessary heat. The Power Bridge can potentially provide thermal performance advantages as will now be explained.

Because the heat buildup is concentrated in space at the Power Bridge, any preferred cooling means (eg, a fan) can focus its cooling action more closely on the source of unwanted heat more effectively than in a conventional, spatially-distributed power supply. Also, enhanced communication between the CPU and power supply that may be facilitated by the present invention may help improve control of the operation of the cooling means. This is because better diagnostic and/or predictive information about changing CPU power requirements over time can help the cooling means controller know when to turn the cooling means on or off and/or at what intensity level the cooling means should operate at any given time for optimally efficient cooling action.

For example, in this embodiment of a portable computer, a small fan (not shown) cools a heat sink (not shown) connected to the microprocessor and other major heat sources. The speed of this fan is controlled so that the fan operates more quietly and efficiently. Output connection cooling fan 138t is provided to facilitate this speed control for a fan having a DC or brushless DC motor.

By facilitating the reduction of power levels when full power is not needed, and by standardizing the power-reduction protocols for peripherals as well as for the chipset, unnecessary power use can be reduced in comparison with the distributed power approach which is the current state-of-art.

By employing ultra high efficiency power supplies (see DEFINITIONS) the loss of energy in the power conversion and control function can itself be reduced. It is noted that high or ultra high efficiency power supplies can be used in conventional, spatially-distributed power supply systems. However, the layout efficiency and reduction in component count allowed by the power supply system integration of the present invention makes easier the implementation of these high or ultra high efficiency power supplies.

The heat generated by the operation of the Power Bridge is concentrated in the central active region, the substrate proximate to the Power Bridge, and (to a lesser extent) in the nearby inductors and capacitors. This presents a more concentrated heat source to the thermal designer, facilitating conduction to a heat sink and dispersal to the ambient air by natural or forced convection. Because the Power Bridge is supplying all, or nearly all power to the computer, it is ideally configured to calculate the amount of cooling required and operate the fan or other cooling means, even in anticipation of the arrival of the resulting thermal pulses.

In some embodiments of the invention, the integrated power supplies may not encompass all power supplies needed for the computer, but rather may include of the dc-dc converter implemented power supplies needed to supply the major power requirements. In the portable computer embodiment of FIGS. 1 to 3, many of the smaller and specialized power requirements can be left to be distributed around the mainboard. This means that the complexity of the power output block is reduced to include fewer individual outputs of common voltage. In this way, the cost, size, pin count and complexity of the Power Bridge can be reduced. The flexibility to support a wider variety of peripherals such as dual-lamp displays, LED-backlit displays and specialized cooling devices is also increased. But as an integrated member of the chipset, this second preferred embodiment continues to carry out the full complement of chipset-specific power responsibilities.

Figure 5:
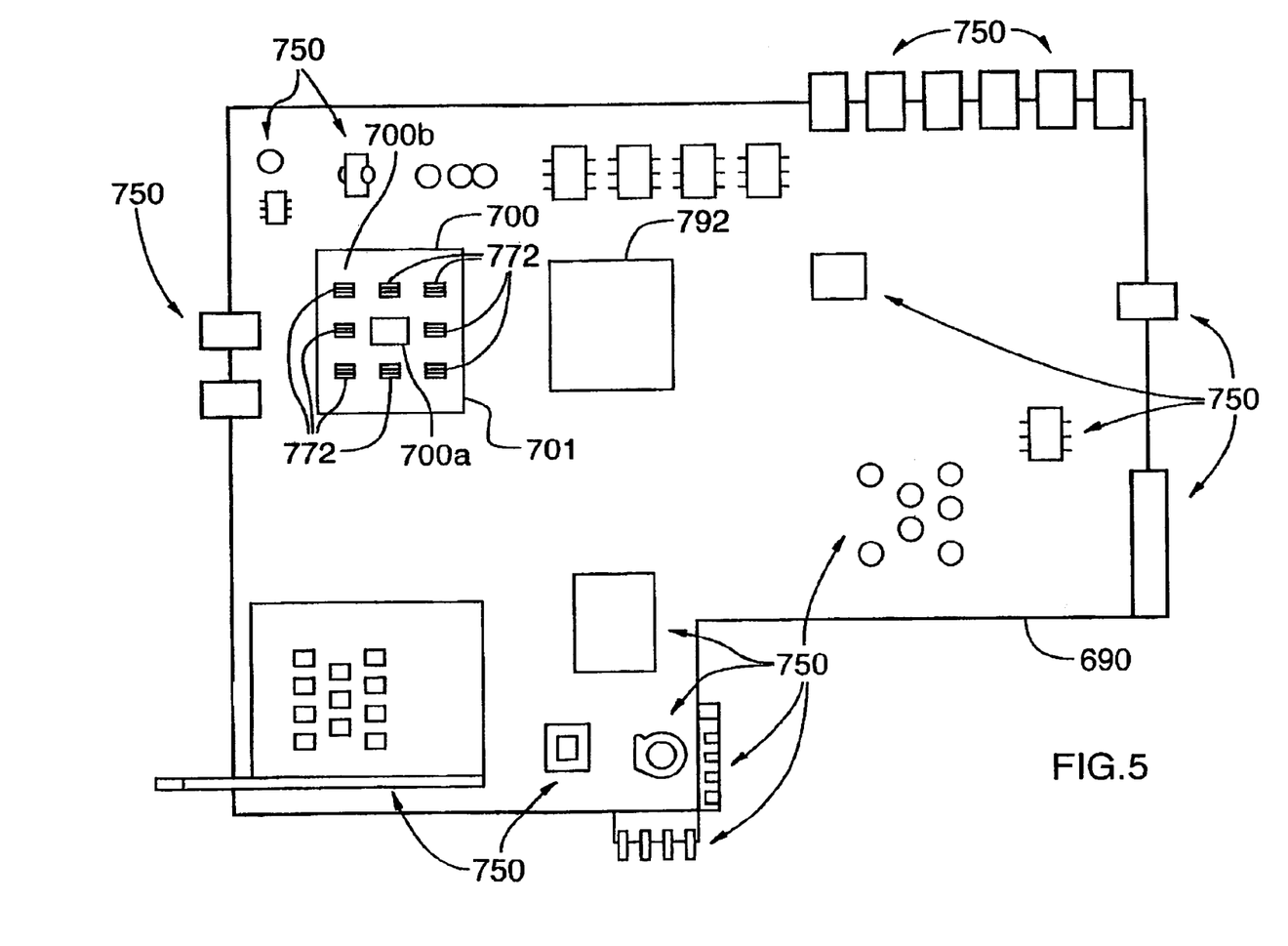
FIG. 5 is a top view of a mother board including a second embodiment of a power supply according to the present invention.
Figure 6:
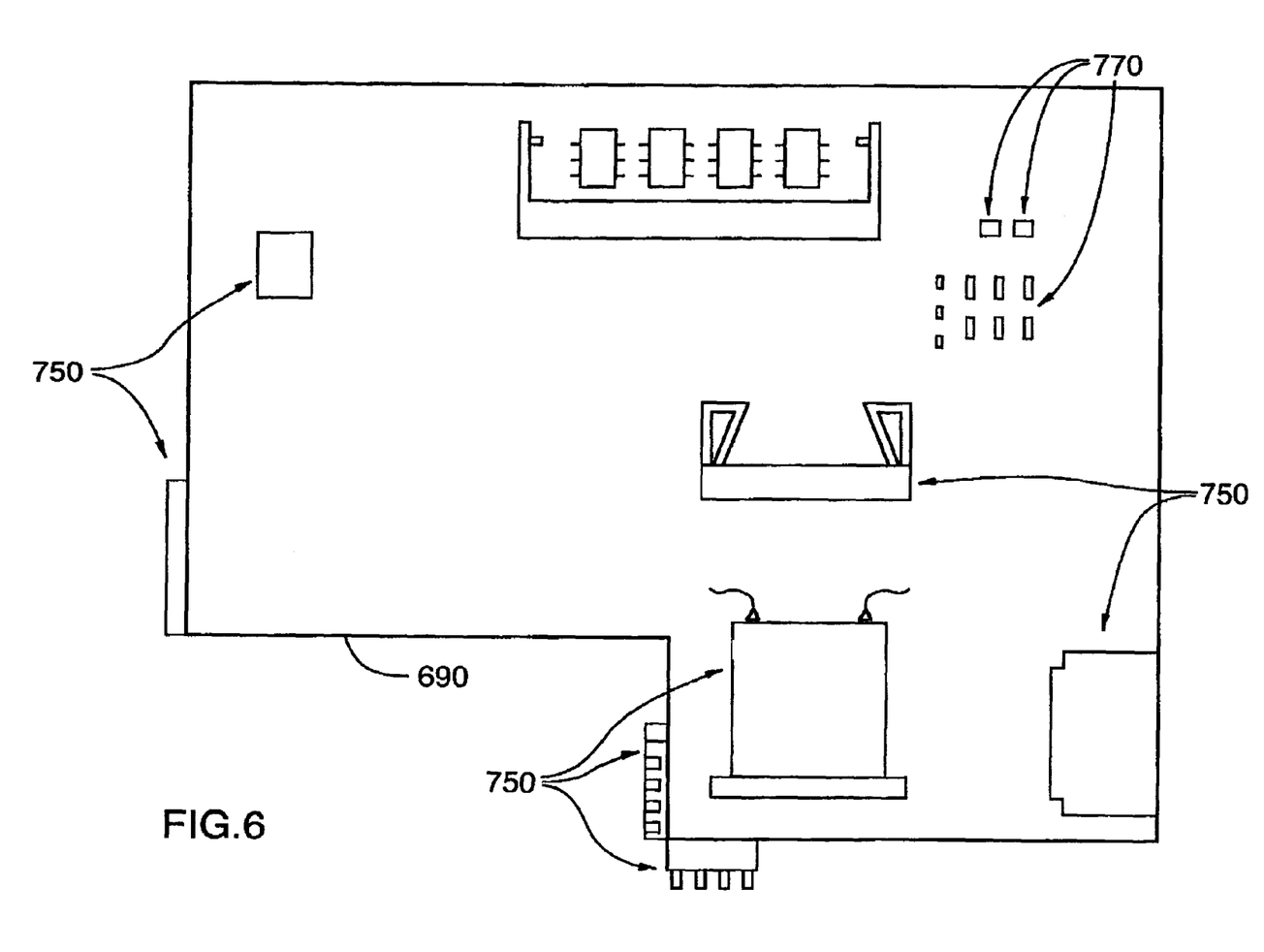
FIG. 6 is a bottom view of the board of FIG. 5.

A second embodiment of a power supply according to the present invention will now be discussed with reference to FIGS. 5 and 6. FIG. 5 shows a top view of board 690 bearing Power Bridge 770, Power Bridge surface-mounted components 772, CPU 792 and other miscellaneous mounted components 750 (not all miscellaneous mounted components 750 are shown for the sake of clarity of illustration). FIG. 6 shows a bottom view of board 690 with (bottom) bearing external components 770 and more miscellaneous mounted components 750.

The CPU is preferably an Intel unit identified the numbers 830, FW82830MG, F2071B04, SL5P9. (It is noted that the Intel Corporation may have trademark rights in the name "Intel.") Power Bridge 700 forms a bridge between the CPU and the external power sources (not shown). The external power sources provide input power signals to the Power Bridge and the Power Bridge (with the help of external components 770 and Power Bridge surface mounted components 772) converts these input power signals into output power signals. The output power signals power the CPU, other miscellaneous mounted components that require power and off-board components (not shown) that require power. The Power Bridge is located and electrically connected in the form of a bridge between the CPU and the external power supplies.

The Power Bridge package 701 contains integrated circuit chip 700a and a printed circuit board substrate 700b with leads for routing signals into and out of IC 700a. External components 770, 772 are capacitors and inductors that perform power conversion functions similar to external components 170 explained above. It is noted that external components 770 are located on the underside of the board, opposite Power Bridge 700. This means that external components 770 have relatively close spatial proximity to the rest of the power conversion circuitry.

Power Bridge surface-mounted components 772 are high frequency capacitors mounted on the exterior surface of package housing 701. Because these components are capacitors, it is highly preferable that they be mounted as closely as possible to the power conversions switches integrated into IC 700a. Because these capacitors are high frequency, they are small in size and can fit on the exterior surface of package housing 701.

Many variations on the above-described embodiments of this invention are possible. The fact that a product or process exhibits differences from one or more of the above-described exemplary embodiments does not necessarily mean that the product or process is outside the scope (literal scope and/or other legally-recognized scope) of the following claims.

DEFINITIONS

The following definitions are provided to facilitate claim interpretation and claim construction:

Conversion of a power input signal into a power output signal: embraces any and all conversions of the electrical characteristics of power signals, including, but not limited to: voltage conversions, voltage regulation, current conversion, ac-to-dc conversion, dc-to-ac conversion, buck mode conversion, boost mode conversion and any combinations of the foregoing types of power conversions.

Package housing: any housing, now known or to be developed in the future, of approximately the same size, or less, as a conventional board-mountable computer component package. Although package housings are preferably mountable to a board (eg, mother board, main board), this board mountability is not an absolute requirement. However, the outer casing of a conventional desktop or laptop computer is far too large to be considered as a "package housing," as that term is used in the following claims. Package housing include, but are not limited to: conventional single die semiconductor packages, conventional, multiple die semiconductor packages and flip chip style packages.

Ultra high efficiency power conversion: Power conversions of greater than 92 percent.

High efficiency power conversion: Power conversions of greater than 86 percent.

Low efficiency power conversion: Any power conversion that is not high efficiency.

High Power power supply system: a power supply system that is designed to output power of 5 watts or greater.

Low Power power supply system: Any power supply system that is not high power.

What is claimed is:

1. A power supply system comprising:
a package housing;
a first circuitry portion, the first circuitry portion comprising at least one first power conversion switch structured to perform power conversion switching to facilitate conversion of at least a first power input signal into a first power output signal;
a second circuitry portion, the second circuitry portion comprising at least one second power conversion switch structured to perform power conversion switching to facilitate conversion of at least the first power input signal into a second power output signal;
a third circuitry portion, the third circuitry portion comprising at least one third power conversion switch structured to perform power conversion switching to facilitate conversion of at least the first power input signal into a third power output signal;
a fourth circuitry portion, the fourth circuitry portion comprising at least one fourth power conversion switch structured to perform power conversion switching to facilitate conversion of at least the first power input signal into a fourth power output signal;
a fifth circuitry portion, the fifth circuitry portion comprising at least one fifth power conversion switch structured to perform power conversion switching to facilitate conversion of the first power input signal into a fifth power output signal;
a control logic block, located within the package housing, the control logic block being structured and located to at least partially control the operation of the at least one first power conversion switch, the at least one second power conversion switch, the at least one third power conversion switch, the at least one fourth power conversion switch, and the at least one fifth power conversion switch;
a first switch driver for controlling the position of the at least one first power conversion switch;
a second switch driver for controlling the position of the at least one second power conversion switch;
a third switch driver for controlling the position of the at least one third power conversion switch;
a fourth switch driver for controlling the position of the at least one fourth power conversion switch;
a fifth switch driver for controlling the position of the at least one fifth power conversion switch;
a control input/output port, located within the package housing, the control input/output port being structured and located to receive at least one communication signal from outside of the package housing, wherein:
a mode of the first, second, third, fourth and fifth power conversion switches is determined by the communication signal;
the operation of the first, second, third, fourth and fifth switch drivers is controlled by
the control logic block based at least in part by the mode; and
wherein all power conversion switches required for respectively convening the first power input signal into the first through fifth power output signals are located within the package housing.

2. The system of claim 1 wherein:
the first power input signal is a dc signal;
the first power output signal is a dc signal; and
the second power output signal is a dc signal.

3. The system of claim 1 wherein:
the first power input signal is a dc signal;
the first power output signal is an ac signal; and
the second power output signal is a dc signal.

4. The system of claim 1 wherein:
the at least one first power conversion switch is structured to perform ultra high efficiency power conversion; and
the at least one second power conversion switch is structured to perform ultra high efficiency power conversion.

5. The system of claim 1 wherein:
the at least one first power conversion switch is structured to perform high efficiency power conversion; and
the at least one second power conversion switch is structured to perform high efficiency power conversion.

6. The system of claim 1 wherein the at least one first power conversion switch is structured to perform low efficiency power conversion.

7. The system of claim 1 wherein:
the first circuitry portion comprises at least two first power conversion switches structured to perform power conversion switching to facilitate conversion of the first power input signal into the first power output signal; and the second circuitry portion comprises at least two second power conversion switches structured to perform power conversion switching to facilitate conversion of the second power input signal into the second power output signal.

8. The system of claim 1 wherein the system is high power.

9. The system of claim 1 wherein the system is low power.

10. The system of claim 1 further comprising the core of a central processing unit, wherein the at least one first power conversion switch is operable so that the first power output signal has an adjustable voltage output in the range of about +0.5 volts to +2.0 volts and is suitable for supporting the core.

11. The system of claim 10 wherein the at least one second power conversion switch is operable so that the second power output signal has an adjustable voltage output in the range of about +0.5 volts to +2.0 volts and is suitable for supporting the core.

12. The system of claim 1 wherein the first power output signal has a voltage of about +5 volts.

13. The system of claim 1 wherein the first power output signal has a voltage of about +3.3 volts.

14. The system of claim 1 wherein the first power output signal has a voltage of about +1.8 volts.

15. The system of claim 1 wherein the first power output signal has a voltage of about +2.5 volts.

16. The system of claim 1 wherein the first power output signal has a voltage of about +12 volts.

17. The system of claim 1 wherein the system comprises a bridge between at least one power supply and a central processing unit.

18. The system of claim 1 further comprising a flip chip style die, including the first circuitry portion, the second circuitry portion, the third circuitry portion, the fourth circuitry portion, and the fifth circuitry portion, wherein the package housing is a flip chip style housing.

19. The system of claim 1 further comprising at least one semiconductor die, the at least one semiconductor die including the first circuitry portion, the second circuitry portion the third circuitry portion, the fourth circuitry portion, and the fifth circuitry portion.

20. The system of claim 1 further comprising a control input/output port, located within the package housing, the control input/output port being structured and located to receive at least one communication signal from outside of the package housing.

21. The system of claim 20 wherein the control input/output port is a serial port.

22. The system of claim 20 wherein the control input/output port comprises a USB port.

23. The system of claim 20 wherein the control input/output port comprises an I2C port.

24. The system of claim 20 wherein the control input/output port comprises a fixed port.

25. The system of claim 20 wherein the control input/output port comprises a SMbus port.

26. The system of claim 1 further comprising:
a computer; and
an on/off control block, located within the package housing, the on/off control block being structured and located to initiate a power up process for the computer.

27. The system of claim 26 wherein:
the computer comprises an on/off switch; and
the on/off control block comprises an on/off port for interfacing with the on/off switch.

28. The system of claim 26 wherein the on/off port is designed for ultra-low power consumption when the computer is in a power-off condition.

29. The system of claim 26 further comprising a computer including an embedded controller, wherein the on/off control block comprises an embedded controller power-up module structured and located to power up the embedded controller.

30. The system of claim 1 further comprising:
a first battery;
a first battery-charging output, located within the package housing, the first battery charging output having an adjustable voltage and current suitable for charging the first battery;
a first battery current path structured and located to electrically connect the first battery and the first battery-charging output so that the first battery can be charged by electrical power from the first battery-charging output.

31. The system of claim 30 further comprising a serial battery communication interface, located within the package housing, for communication with the battery.

32. The system of claim 30 further comprising:
a second battery;
a second battery-charging output, located within the package housing, the second battery charging output having an adjustable voltage and current suitable for charging the second battery;
a second battery current path structured and located to electrically connect the second battery and the second battery-charging output so that the second battery can be charged by electrical power from the second battery-charging output.

33. The system of claim 1 further comprising:
a transformer suitable for powering a display backlight;
an ac output, located within the package housing, the ac output having adjustable voltage and/or current so that it is suitable for powering the transformer; and
a transformer current path structured and located to electrically connect the transformer and the ac output so that the transformer can be powered by electrical power from the ac output.

34. A power supply system comprising:
a package housing;
a first circuitry portion, located within the package housing, the first circuitry portion comprising at least one first power conversion switch, and being structured, electrically connected and/or programmed to perform power conversion switching to selectively convert at least a first power input signal and a second power input signal into a first power output signal; and
a second circuitry portion, located within the package housing, the second circuitry portion comprising at least one second power conversion switch, and being structured, electrically connected and/or programmed to perform power conversion switching to selectively convert at least the first power input signal and the second power input signal into a second power output signal;
wherein all power conversion switches required for respectively converting the first and second power input signals into the first and second power output signals are located within the package housing;
the first circuitry portion is further structured, electrically connected and/or programmed to perform power conversion switching to selectively convert a third power input signal into the first power output signal; and
the second circuitry portion is further structured, electrically connected and/or programed to perform power conversion switching to selectively convert the third power input signal into the second power output signal.

35. The system of claim 34 further comprising a third circuitry portion, located within the package housing, the third circuitry portion comprising at least one third power conversion switch, and being structured, electrically connected and/or programmed to perform power conversion switching to selectively convert at least the first power input signal and the second power input signal into a third power output signal, wherein all power conversion switches required for respectively converting the first and second power input signals into the third output signal are located within the package housing.

36. The system of claim 35 further comprising:
a fourth circuitry portion, located within the package housing, the fourth circuitry portion comprising at least one fourth power conversion switch and being structured, electrically connected and/or programmed to perform power conversion switching to selectively convert at least the first power input signal and the second power input signal into a fourth power output signal; and
a fifth circuitry portion, located within the package housing, the fifth circuitry portion comprising at least one fifth power conversion switch, and being structured, electrically connected and/or programmed to perform power, conversion switching to selectively convert at least the first power input signal and the second power input signal into a fifth power output signal; and
wherein all power conversion switches required for respectively converting the first and second power input signals into the fourth and fifth output signals are located within the package housing.

37. The system of claim 34 further comprising:
a third circuitry portion, located within the package housing, the third circuitry portion comprising at least one third power conversion switch, and being structured, electrical) connected and/or programmed to perform power conversion switching to selectively convert at least the first power input signal, the second power input signal and the third power input signal into a third power output signal;
a fourth circuitry portion, located within the package housing, the fourth circuitry portion comprising at least one fourth power conversion switch, and being structured, electrically connected and/or programmed to perform power conversion switching to selectively convert at least the first power input signal, the second power input signal and the third power input signal into a fourth power output signal; and
a fifth circuitry portion, located within the package housing, the fifth circuitry portion comprising at least one fifth power conversion switch, and being structured, electrically connected and/or programmed to perform power conversion switching to selectively convert at least the first power input signal, the second power input signal and the third power input signal into a fifth power output signal; and
wherein all power conversion switches required for respectively converting the first, second and third power input signals into the third, fourth and fifth output signals are located within the package housing.

* * * * *